United States Patent
Hu

(10) Patent No.: US 11,336,953 B2
(45) Date of Patent: May 17, 2022

(54) VIDEO PROCESSING METHOD, ELECTRONIC DEVICE, AND COMPUTER-READABLE MEDIUM

(71) Applicant: GUANGDONG OPPO MOBILE TELECOMMUNICATIONS CORP., LTD., Guangdong (CN)

(72) Inventor: Xiaopeng Hu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/231,774

(22) Filed: Apr. 15, 2021

(65) Prior Publication Data
US 2021/0235153 A1    Jul. 29, 2021

Related U.S. Application Data

(63) Continuation of application No. PCT/CN2019/107074, filed on Sep. 20, 2019.

(30) Foreign Application Priority Data

Oct. 15, 2018 (CN) .......................... 201811198856.9

(51) Int. Cl.
*H04N 21/44* (2011.01)
*H04N 21/81* (2011.01)
(Continued)

(52) U.S. Cl.
CPC ......... *H04N 21/44* (2013.01); *H04N 21/4183* (2013.01); *H04N 21/439* (2013.01);
(Continued)

(58) Field of Classification Search
CPC ................ H04N 21/44; H04N 21/439; H04N 21/8193; H04N 21/4341; H04N 21/84; H04N 21/4183
See application file for complete search history.

(56) References Cited

U.S. PATENT DOCUMENTS

2010/0257569 A1* 10/2010 O'Hanlon .......... H04N 21/8543
725/110
2013/0013671 A1* 1/2013 Relan ...................... G06F 9/452
709/203
(Continued)

FOREIGN PATENT DOCUMENTS

| CN | 102567468 | 7/2012 |
| CN | 102685507 | 9/2012 |

(Continued)

OTHER PUBLICATIONS

SIPO, First Office Action for CN Application No. 201811198856.9, dated Oct. 9, 2019.
(Continued)

*Primary Examiner* — Pinkal R Chokshi
(74) *Attorney, Agent, or Firm* — Hodgson Russ LLP

(57) ABSTRACT

The present application discloses a video processing method, an electronic device, and a computer-readable medium. The method comprises: a system playing module acquiring a video file to be played and sent by a target client; determining whether playing of the video file is supported; if not, parsing the video file to acquire an audio stream and a video stream in the video file; configuring an audio decoder identifier for the audio stream, and configuring a video decoder identifier for the video stream; and sending to an FFmpeg module the video stream, the audio stream, the video decoder identifier, and the audio decoder identifier, such that the FFmpeg module decodes the video file to acquire audio playing data and video playing data, wherein
(Continued)

the audio playing data and the video playing data can be played by an audio and video output module of an electronic device.

20 Claims, 8 Drawing Sheets

(51) Int. Cl.
*H04N 21/43* (2011.01)
*H04N 21/439* (2011.01)
*H04N 21/418* (2011.01)
*H04N 21/434* (2011.01)
*H04N 21/84* (2011.01)

(52) U.S. Cl.
CPC ..... *H04N 21/4341* (2013.01); *H04N 21/8193* (2013.01); *H04N 21/84* (2013.01)

(56) References Cited

U.S. PATENT DOCUMENTS

| | | | |
|---|---|---|---|
| 2015/0010291 A1 | 1/2015 | Muller | |
| 2015/0070585 A1* | 3/2015 | Sharif-Ahmadi | G08C 17/02 348/564 |
| 2016/0029002 A1 | 1/2016 | Balko | |
| 2017/0155937 A1* | 6/2017 | Zhang | H04L 69/08 |
| 2019/0069006 A1* | 2/2019 | Rachabathuni | H04N 21/8456 |

FOREIGN PATENT DOCUMENTS

| | | |
|---|---|---|
| CN | 103546799 | 1/2014 |
| CN | 103731672 | 4/2014 |
| CN | 104394456 | 3/2015 |
| CN | 104980788 | 10/2015 |
| CN | 106060627 | 10/2016 |
| CN | 107995522 | 5/2018 |
| CN | 108010534 | 5/2018 |
| CN | 108235096 | 6/2018 |
| CN | 108600813 | 9/2018 |
| EP | 3200470 | 8/2017 |
| EP | 3319320 | 5/2018 |

OTHER PUBLICATIONS

SIPO, Second Office Action for CN Application No. 201811198856.9, dated Apr. 8, 2020.
SIPO, Notification to Grant Patent Right for Invention for CN Application No. 201811198856.9, dated Jul. 16, 2020.
WIPO, International Search Report for PCT Application No. PCT/CN2019/107074, dated Dec. 25, 2019.
Anonymous: "FFmpeg—Wikipedia", retrieved from the Internet: <https://en.wikipedia.org/w/index.php?title=FFmpeg&oldid=840032902>, 2018, 15 pages.
Song et al., "Research on Architecture of Multimedia and Its Design Based on Android," IEEE International Conference on Internet Technology and Applications, 2010, 4 pages.
EPO, Extended European Search Report for EP Application No. 19873400.6, dated Sep. 16, 2021.

* cited by examiner

VIDEO PROCESSING METHOD, ELECTRONIC DEVICE, AND COMPUTER-READABLE MEDIUM

CROSS REFERENCE TO RELATED APPLICATION

This application is a continuation of International Application No. PCT/CN2019/107074, filed on Sep. 20, 2019, which claims priority to Chinese Patent Application No. 201811198856.9, filed on Oct. 15, 2018. The entire disclosures of the above-mentioned applications are incorporated herein by reference.

TECHNICAL FIELD

The disclosure relates to the field of video processing technology, and more particularly, to a video processing method, an electronic device, and a computer-readable medium.

BACKGROUND

With the development of electronic technology and information technology, more and more devices are capable of playing video. During a video playing process, the client installed on the device needs to perform operations such as parsing, decoding, rendering, and synthesizing on the video, and then to display the video stream on the screen and play the audio stream through the audio device. However, it will lead to a poor user experience if some clients do not support the playing of a certain video.

SUMMARY

The disclosure provides a video processing method, an electronic device, and a computer-readable medium to improve the aforementioned defect.

In a first aspect, an embodiment of the disclosure provides a video processing method applied to an electronic device, the electronic device includes a system play module and an FFmpeg module. The method includes: acquiring, through the system play module, a to-be-played video file sent from a target client; determining whether playing of the to-be-played video file is supported by the system play module; parsing, through the system play module, the to-be-played video file to acquire an audio stream and a video stream in the to-be-played video file, upon determining playing of the to-be-played video file is not supported by the system play module; configuring, through the system play module, an audio decoder identifier for the audio stream, and configuring, through the system play module, a video decoder identifier for the video stream; sending, through the system play module, the video stream, the audio stream, the video decoder identifier, and the audio decoder identifier to the FFmpeg module; determining, through the FFmpeg module, a corresponding video decoder according to the video decoder identifier; decoding, through the corresponding video decoder, the video stream to acquire video playing data; determining, through the FF mpeg module, a corresponding audio decoder according to the audio decoder identifier; and decoding, through the corresponding audio decoder, the audio stream to acquire audio playing data, the audio playing data and the video playing data being configured to be played by an audio and video output module of the electronic device.

In a second aspect, an embodiment of the disclosure provides an electronic device, including a processor including a system play module and a FFmpeg module, a memory, an audio and video output module, and one or more programs. The one or more programs are stored in the memory and configured to perform, when executed by the processor, the above method.

In a third aspect, an embodiment of the disclosure provides a computer-readable storage medium, storing program codes which, when executed by a processor, cause the processor to perform the above method.

When playing of the to-be-played video file is not supported, the system play module can parse the to-be-played video file to a video stream and an audio stream, configure corresponding decoder identifiers for the video stream and the audio stream respectively, and then send the streams and the decoder identifiers together to the FFmpeg module. The FFmpeg module decodes the audio stream and the video stream based on the corresponding decoders to obtain audio playing data and video playing data. By calling the FFmpeg module, the video files that the playing of which is not supported can be played successfully.

BRIEF DESCRIPTION OF THE DRAWINGS

In order to explain the technical solutions in the embodiments of the disclosure more clearly, the drawings need to be used in the description of the embodiments are briefly introduced below. Obviously, the following described drawings just illustrate some embodiments of the disclosure. For those of ordinary skill in the art, other drawings can be acquired based on these drawings without creative work.

DETAILED DESCRIPTION OF THE EMBODIMENTS

In order to enable those of ordinary skill in the art to better understand the solutions of the disclosure, the technical solutions in the embodiments of the disclosure will be clearly and completely described below with reference to the accompanying drawings in the embodiments of the disclosure.

Figure 1:
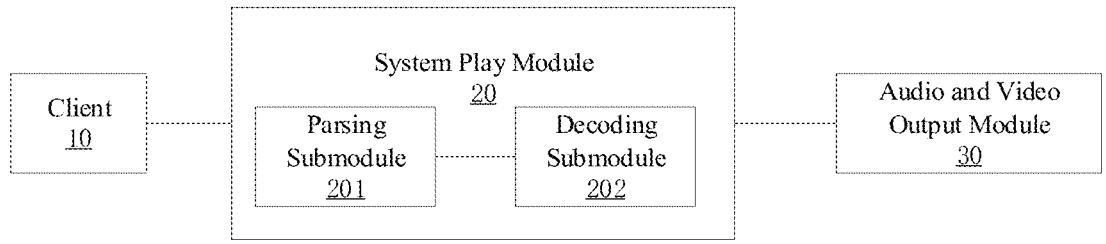
FIG. 1 is a block diagram showing a video playing architecture according to an embodiment of the disclosure.

Referring to FIG. 1, it shows a block diagram of a video playing architecture. As shown in FIG. 1, the system includes a client 10, a system play module 20 and an audio and video output module 30.

Once the client 10 acquires a to-be-played video file, it sends the video file to the system play module 20, after the system play module 20 acquires to-be-played data, the next step is to parse the audio and video data. A video file generally consists of two parts: a video stream and an audio stream, and the audio and video data of different video formats have different encapsulation formats. The process of synthesizing an audio stream and a video stream into a file is referred to as muxer, while the process of separating an audio stream and a video stream from a media file is referred to as demuxer. The system play module 20 is a default play module in the operating system of the electronic device, that is, when the client installed in the electronic device plays a video file, the system play module 20 is called by default to play the video file. In the Android system, the system play module 20 may be a Media Framework module.

Playing a video file needs to separate an audio stream and a video stream from the file stream, that is, the process of parsing the video file, and this process is executed by a parsing submodule 201 in the system play module 20, where the parsing submodule 201 may be an MediaExtractor module in the Android system. In addition, during the parsing process, in addition to parsing the video file into a video stream and an audio stream, it is also necessary to configure corresponding decoders for the video stream and the audio stream, that is, configuring a corresponding decoding strategy. The decoded video frames can be directly rendered, the decoded audio frames can be sent to a buffer of an audio output device for playing, and, of course, the timestamps of video rendering and audio playing must be controlled to be synchronized, where the decoding operation is executed by a decoding submodule 202 in the system play module 20. The decoding submodule 202 may be Media-Codec in the Android system.

Specifically, video decoding may include hard decoding and soft decoding. Hardware decoding is to hand over part of the video data that was originally processed by the Central Processing Unit (CPU) to the Graphics Processing Unit (GPU) for processing, and the parallel computing capability of GPU is much higher than that of CPU, in this way, the CPU load can be greatly reduced, and with lower CPU occupancy rate, some other programs can be run at the same time. Of course, for better processors, such as i5 2320 or any quad-core processor from AMD, a hard decoding or a soft decoding is selected according to requirements.

The decoded audio stream becomes audio playing data, for example, it may be audio data in PCM format, and the audio and video output module 30 drives the voice coil and other components of the audio playing device to vibrate to generate sound according to the PCM code. In the same way, the decoded video stream becomes video playing data, for example, it can be video data in YUV format, the audio and video output module 30 sends the video data in YUV format to the layer transfer module (SurfaceFlinger), and after SurfaceFlinger renders and synthesizes the decoded video data, the video is displayed on the display. SurfaceFlinger is an independent Service, it receives the Surfaces of all Windows as input, calculates the position of each Surface in the final synthesized image according to parameters such as ZOrder, transparency, size, and position, then submits it to HWComposer or OpenGL to generate the final display Buffer, and then display it to a specific display device.

However, the inventor found in research that due to system update issues or client version issues, the system play module does not support the playing of video files in some formats, for example, MP4 format. If playing of video file in this format is not supported, a third-party application will be called to play it, that is, when using the system play module, if a video file cannot be decoded, a third-party application can be called to soft decode the video file to acquire the audio data and video data that are configured to be played by the audio and video output module. However, using a third-party application to play the video file will call the third-party application, that is, the current client is switched to the background and the third-party application is brought to the foreground, user's operation on the client will be interrupted, and the client's mute playing function for the video will not be realized.

Figure 2:
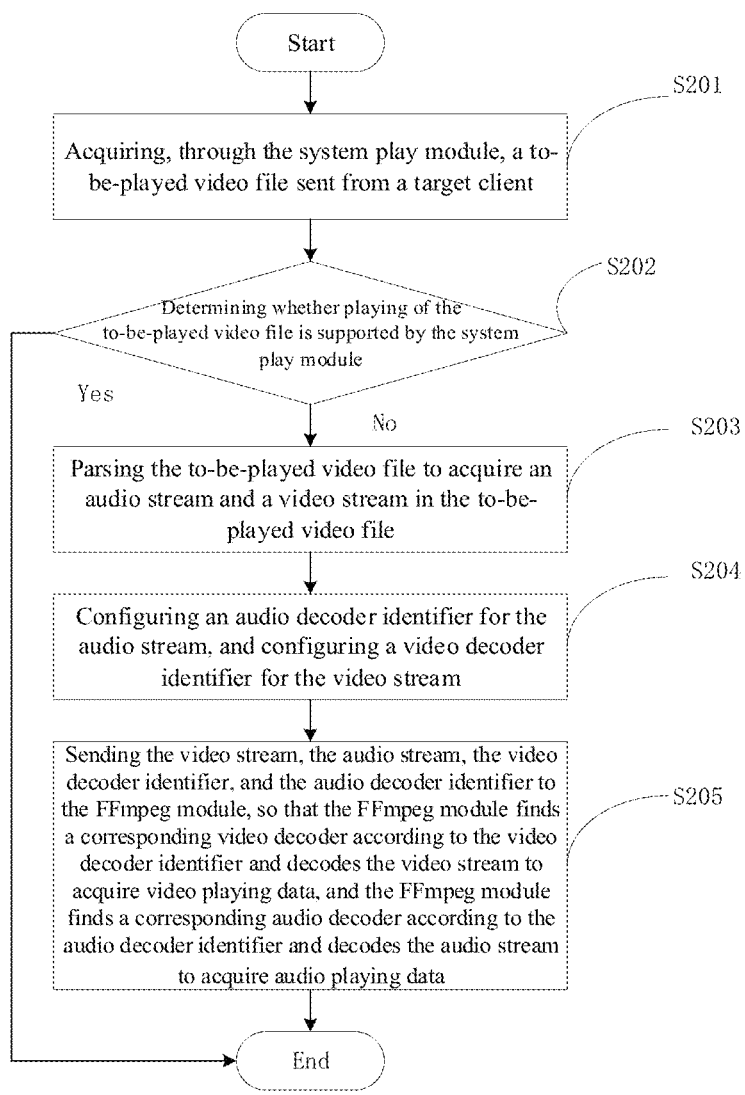
FIG. 2 is a flowchart showing a video processing method according to an embodiment of the disclosure.

Therefore, in order to overcome the above-mentioned defect, referring to FIG. 2, an embodiment of the disclosure provides a video processing method applied to the above-mentioned electronic device. The electronic device includes a system play module and an FFmpeg module. Specifically, an executor of the method is the system play module, and the method includes: S201 to S204.

S201: acquiring, through the system play module, a to-be-played video file sent from a target client.

Specifically, the client is an application installed in the electronic device, and has a video playing function. The client has an icon on the system desktop, and the user can click the icon of the client to open the client, for example, confirming from the package name of the application clicked by the user, the package name of the video application can be acquired from the codes in the system background, and the format of the package name is: com.android.video.

Display contents corresponding to a plurality of videos are displayed on the video list interface of the client, the display contents corresponding to the plurality of videos includes thumbnails, each of which corresponds to a video, and the thumbnail can be used as a touch button. When the user clicks the thumbnail, the client can detect the thumbnail the user wants to click, and thus can determine the to-be-played video file the user wants to play.

In response to the video selected by the user in the video list, the client enters the video play interface, by clicking the play button on the play interface, the client can detect what type of video the user is currently clicking by monitoring the user's touch operation. Specifically, the play button is provided with a preset attribute, once the attribute of the play button corresponding to the acquired touch operation is detected, the to-be-played video selected by the user can be determined.

After the to-be-played video file input by the user is acquired, the client sends the to-be-played video file to the system play module, such that the system play module parses and decodes the video file and then plays it.

S202: determining whether playing of the to-be-played video file is supported by the system play module;

The system play module can parse a supported video file into a video stream and an audio stream, and can successfully decode the video stream and the audio stream to acquire audio playing data and video playing data, where the audio playing data and the video playing data are configured to be played by the audio and video output module of the electronic device, for example, the audio playing data and the video playing data are audio PCM data and video YUV data, respectively.

For a video file that the playing of which is not supported by the system play module, the system play module cannot parse this video file, that is, the corresponding video stream and audio stream cannot be acquired from the video file, or even if the video file can be parsed normally, that is, the corresponding video stream and audio stream can be acquired from the video file, since the video stream and audio stream in those formats cannot be decoded, the audio playing data and the video playing data cannot be acquired, therefore the video file cannot be played normally.

Specifically, acquiring a target type of the to-be-played video file.

As an implementing manner, the type of the video file can be determined by the extension of the video file. For example, with a .mp4 extension, the target type of the to-be-played video file is mp4.

Determining whether playing of the to-be-played video file of the target type is supported. The type of the video file may be the format of the video file. The system play module correspondingly has a format list of video files that are supported to be played, a plurality of format identifiers are included in the format list, and the video files corresponding to each format in the format list can be played normally. Specifically, the format list may include the format of the audio stream and the format of the video stream corresponding to the format of the video file, and the decoder identifiers corresponding to the format of each video stream and the format of each audio stream. By looking up in the format list, the correct decoders for the supported video format can be configured normally. Where the format of the video file is the type of the video file, the format of the video stream is the type of the video stream, and the format of the audio stream is the type of the audio stream.

Therefore, after the target type of the video file is acquired, determining whether the target type of the video file matches the type of the video file in the format list by looking up in the format list, if there is a matching type, determining that playing of the video file of the target type is supported, if there is no matching type, determining that playing of the video file of the target type is not supported.

S203: parsing the to-be-played video file to acquire an audio stream and a video stream in the to-be-played video file.

The system play module uses the parsing submodule to parse the to-be-played video file to acquire the corresponding video stream and audio stream, for example, through the demuxer process mentioned above, the video stream and the audio stream corresponding to the to-be-played video file can be acquired after decapsulating the to-be-played video file.

S204: configuring an audio decoder identifier for the audio stream, and configuring a video decoder identifier for the video stream.

Figure 3:
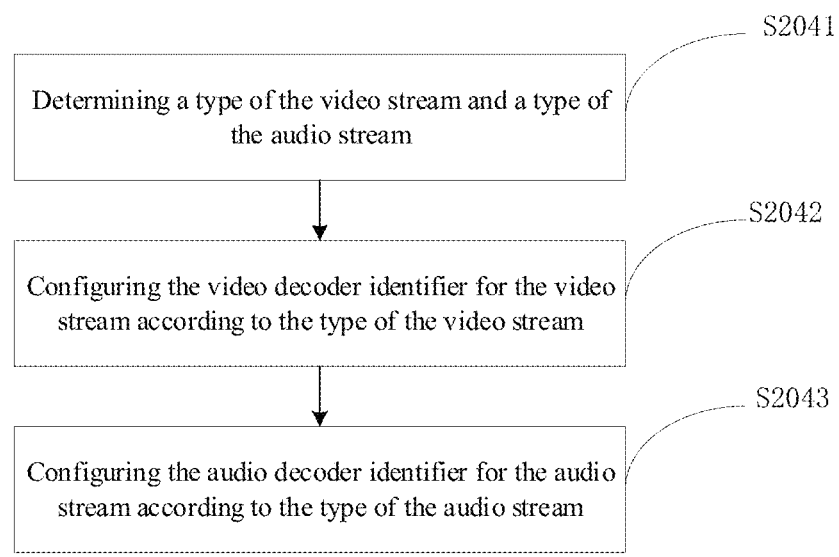
FIG. 3 is a flowchart showing S204 in FIG. 1.

Specifically, as shown in FIG. 3, the steps of S204 may include: S2041 to S2043.

S2041: determining a type of the video stream and a type of the audio stream.

In the same way, after the video stream and the audio stream are acquired, the type of the video stream and the type of the audio stream can also be determined by acquiring the extensions of the video stream and the audio stream.

S2042: configuring the video decoder identifier for the video stream according to the type of the video stream.

A first corresponding relationship between the type of the video stream and the video decoder identifier is acquired in advance. The first corresponding relationship may be manually input by the user, for example, the corresponding relationship is inputted based on the introduction of the video decoders that have been determined to be capable of decoding video files of this type. For example, the first corresponding relationship may be acquired from a network server, and for each type of video stream, the network server counts the identifier of decoder that can decode the video stream.

Of course, the first corresponding relationship can also be acquired by the FFmpeg module. Specifically, the first corresponding relationship may be set according to the decoder identifier corresponding to each type of video stream in the format list corresponding to the FFmpeg module when the FFmpeg module is installed.

After the type of the video stream corresponding to the to-be-played video file is acquired, the first corresponding relationship is used to determine the identifier of the decoder capable of decoding this type of video stream, so as to configure the video decoder identifier for the video stream.

S2043: configuring the audio decoder identifier for the audio stream according to the type of the audio stream.

In the same way, a second corresponding relationship between the type of the audio stream and the audio decoder identifier is also acquired in advance, and the second corresponding relationship may also be acquired in a manner as the above-mentioned first corresponding relationship. After the type of the audio stream corresponding to the to-be-played video file is acquired, the second corresponding relationship is used to determine the identifier of the audio decoder capable of decoding this type of audio stream, so as to configure the audio decoder identifier for the audio stream.

S205: sending the video stream, the audio stream, the video decoder identifier, and the audio decoder identifier to the FFmpeg module, so that the FFmpeg module determines a corresponding video decoder according to the video decoder identifier and decodes the video stream to acquire video playing data, and the FFmpeg module determines a corresponding audio decoder according to the audio decoder identifier and decodes the audio stream to acquire audio playing data.

Where the audio playing data and the video playing data are configured to be played by an audio and video output module of the electronic device.

The FFmpeg module is an open-source cross-platform video and audio stream framework, which is a free software and uses LGPL or GPL licenses (depending on the selected components). It provides a complete solution for recording, converting, and streaming audio and video, and it contains a rich audio/video codec library (libavcodec).

The FFmpeg module consists of the following parts:
1. ffmpeg, a command line tool for video file conversion.
2. ffserver, a multimedia server based on HTTP and RTSP for real-time broadcasting.
3. ffplay, a simple media player developed with SDL and FFmpeg libraries.
4. libavcodec, a library that contains all FFmpeg audio and video codecs.
5. libavformat, a library containing all the parsers and generators of common audio and video formats.

Therefore, the FFmpeg module integrates multiple formats of audio encoders and video encoders, and has audio and video playing function, and video file parsing function.

Therefore, by implanting the FFmpeg module into the operating system of the electronic device, and defining the calling interface between the system play module and the FFmpeg module, for example, an API or an SDK, the system play module and the FFmpeg module can communicate with each other.

When it is determined that normal playing of the video file requested by the client is not supported, the system play module sends the video file to the FFmpeg module, and due to the powerful encoding and decoding capabilities of the FFmpeg module, parsing and decoding for a large number of formats of video files are supported. In addition, the FFmpeg module can be implanted into the operating system, and the FFmpeg module can be used as a service process to decode video files in the background of the system, so as to generate audio playing data and video playing data, without switching to the foreground to force the client to switch to the background, thereby avoiding interrupting the user's operation on the client.

In addition, after acquiring the audio playing data and the video playing data, the FFmpeg module can send the audio playing data and the video playing data to the system play module, and the system play module controls the audio and video output module of the electronic device to use an audio play device (for example, a speaker, an earpiece, an earphone, etc.) to play the audio playing data, and use a video play device (for example, a screen) to play the video playing data.

Of course, the FFmpeg module may also directly control the audio and video output module of the electronic device to output the audio playing data and the video playing data.

Since the FFmpeg module has the ability to parse and decode video files, the system play module may directly deliver the to-be-played video file to the FFmpeg module, and the FFmpeg module parses and decodes the to-be-played video file. In addition, after the to-be-played video file is parsed by the system play module, the acquired video stream and audio stream may be sent to the FFmpeg module for decoding After the video stream, the video decoder identifier corresponding to the video stream, the audio stream, and the audio decoder identifier corresponding to the audio stream are acquired by the system play module, they are packaged together and sent to the FFmpeg module. Specifically, the video stream and the audio stream is stored in the storage space of the electronic device, address identifiers such as handles or pointers are defined, and the process of sending the video stream and the audio stream to the FFmpeg module is to send the address identifier of the audio stream and the address identifier of the video stream to the FFmpeg module, thus the FFmpeg module can acquire the audio stream corresponding to the address identifier from the storage space of the electronic device according to the address identifier of the audio stream, in the same way, the FFmpeg module can acquire the video stream corresponding to the address identifier from the storage space of the electronic device according to the address identifier of the video decoder.

The FFmpeg module determines the video decoder corresponding to the video decoder identifier and the audio decoder corresponding to the audio decoder identifier according to the prestored corresponding relationship between the decoder identifier and the decoder. Then, the video decoder is called to decode the video stream to acquire video playing data, and the audio decoder is called to decode the audio stream to acquire audio playing data. Thus, by calling the FFmpeg module, the video file, the playing of which is not supported, can be played successfully.

Figure 4:
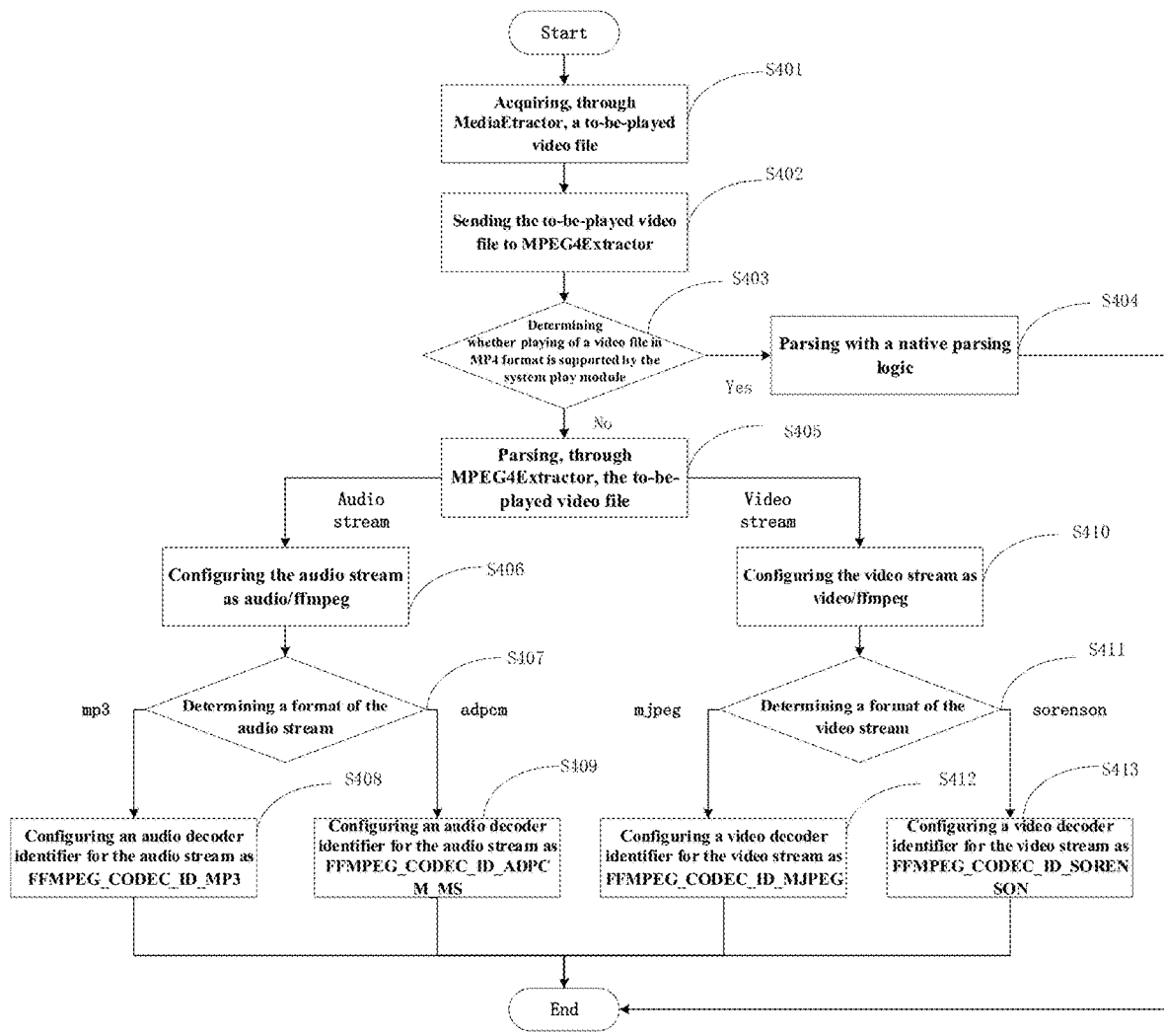
FIG. 4 is a flowchart showing a video processing method according to another embodiment of the disclosure.

In the following, take it as an example where the target type is an MP4 type to illustrate the method of the disclosure. As shown in FIG. 4, the video processing method includes: S401 to S413.

S401: acquiring, through MediaEtractor, a to-be-played video file.

When the client installed in the electronic device plays a video, the client sends the to-be-played video file to the system play module through a API interface with MediaEtractor, that is, under the default playing process of the client, the client sends the to-be-played video data to MediaEtractor for parsing, and the API interface is provided between MediaEtractor and the client.

S402: sending the to-be-played video file to MPEG4Extractor.

Specifically, after MediaEtractor acquires the to-be-played video file, it is determined that the to-be-played video file is of an MP4 type, and MPEG4Extractor is selected to parse the video file of MP4 type, and then the to-be-played video file is sent to MPEG4Extractor, where MediaEtractor and MPEG4Extractor are both program modules implanted into the system play module.

S403: determining whether playing of a video file in MP4 format is supported by the system play module.

Then, the system play module determines whether playing of the video file in MP4 format is supported. Specifically, MPEG4Extractor may determine whether playing of the video file in MP4 format is supported.

S404: parsing with a native parsing logic.

If playing of the video file in MP4 format is supported, the video file can be parsed according to the native parsing logic. Specifically, MediaExtractor can be used to parse the video data to acquire a video stream and an audio stream, and then the MediaCodec can be used to decode the video stream and the audio stream to acquire audio data in PCM format and video data in YUV format, after that, they are sent to the audio and video output system for output.

S405: parsing, through MPEG4Extractor, the to-be-played video file.

If playing of the video file in MP4 format is not supported, MPEG4Extractor is used to parse the to-be-played video file. Specifically, the type of the video file is determined to be MP4 format, and a type ID is configured for the to-be-played video file, for example, the type ID is mimetype.

Where the type ID is used to indicate the type of the video file. In the embodiment of the disclosure, the type ID defined for MP4 format is inconsistent with the type ID recorded in the system play module, thereby preventing the system play module parsing the video file corresponding to this type ID with the native parsing logic to lead to an error. During the parsing process, in addition to decapsulating the video file into a video stream and an audio stream, it is also necessary to configure a video decoder for the video stream and configure an audio decoder for the audio stream. If the native parsing logic is used for parsing, even if the video stream and audio stream are acquired, the corresponding decoders cannot be successfully configured, therefore an error occurs. The system play module cannot identify the type ID, that is, mimetype, defined in the disclosure, and cannot parse and decode the video file of this type ID. In the case that the type ID is mimetype, the parsing and decoding logic corresponding to the embodiment of the disclosure can be used, instead of the native parsing logic, for parsing.

S406: configuring the audio stream as audio/ffmpeg.

Specifically, on the basis that the type ID is mimetype, the audio/ffmpeg identifier is configured for the audio stream, and the identifier is used as the audio stream identifier. When configuring decoders, in the case it is determined that the audio stream identifier is audio/ffmpeg, the parsing and decoding method of the disclosure, that is, the video processing method using the FFmpeg module, is selected, that is, the audio stream identifier corresponds to the decoding strategy.

S407: determining a format of the audio stream.

For a video file in MP4 format, the format of the audio stream includes mp3 and adpcm, it is determined whether the format of the audio stream is mp3 or adpcm, if it is mp3, S408 is performed, and if it is adpcm, S409 is performed.

S408: configuring an audio decoder identifier for the audio stream as FFMPEG_CODEC_ID_MP3.

Specifically, the program codes for parsing MP4 format can be added to MPEG4Extractor, for example, by adding codes for parsing this kind of chunk type box, MPEG4Extractor is capable of parsing video files in MP4 format through the added code and configuring the decoder.

Specifically, if the audio stream is MP3, the configured audio decoder identifier is FFMPEG_CODEC_ID_MP3, and the decoder corresponding to the identifier can decode the audio stream in MP3 format. For example, parsing and configuring the decoder ID as follows:

define #define FFMPEG_CODEC_ID_MP3 0x15001.

Audio stream mp3:Chunk type is .mp3, the audio stream MimeType is configured to be audio/ffmpeg, and CodecID is configured to be FFMPEG_CODEC_ID_MP3.

Where FFMPEG_CODEC_ID_MP3 is the audio decoder identifier, a value is assigned to the audio decoder identifier, that is, a value of 0x15001 is assigned. When sending the audio decoder identifier to FFmpeg, FFMPEG_CODEC_ID_MP3 and the assigned value of 0x15001 are sent to FFmpeg together, therefore, FFmpeg can determine that the corresponding audio decoder is the MP3 decoder through FFMPEG_CODEC_ID_MP3, or determine the corresponding decoder according to 0x15001.

For example, the defined values of four types of encoders in FFmpeg are:

AV_CODEC_ID_ADPCM_MS=0x11006;
AV_CODEC_ID_MJPEG=0x8;
AV_CODEC_ID_MP3=0x15001;
AV_CODEC_ID_SVQ3=0x18.

In MPEG4Extractor of the system play module, the assignment of the audio decoder identifier configured for the audio stream in MP3 format is the same as the assignment of the audio decoder in MP3 format in FFmpeg, for example, if they are both 0X15001, the MP3 audio decoder can be quickly found through 0X15001, and of course, by analyzing the audio decoder identifier, for example, FFMPEG_CODEC_ID_MP3, it can also be determined that the audio decoder corresponding to the identifier is also an MP3 audio decoder. For example, by extracting the keyword of the identifier, the text "MP3" can be extracted, and then it can be determined that the identifier corresponds to the MP3 audio decoder.

S409: configuring an audio decoder identifier for the audio stream as FFMPEG_CODEC_ID_ADPCM_MS.

In the same way, if the format of the audio stream is adpcm, the configured audio decoder identifier for the audio stream is FFMPEG_CODEC_ID_ADPCM_MS, and the decoder corresponding to the identifier can decode the audio stream in adpcm format. For example, parsing and configuring the decoder ID as follows:

define FFMPEG_CODEC_ID_ADPCM_MS 0x11006.

Audio stream adpcm:Chumk type is ms02, the audio stream MimeType is configured to be audio/ffmpeg, and CodecID is configured to be FFMPEG_CODEC_ID_ADPCM_MS.

Where FFMPEG_CODEC_ID_ADPCM_MS is the audio decoder identifier, a value is assigned to the audio decoder identifier, that is, a value of 0x11006 is assigned. When sending the audio decoder identifier to FFmpeg, FFMPEG_CODEC_ID_ADPCM_MS and the assigned value of 0x11006 are sent to FFmpeg together, therefore, FFmpeg can determine that the corresponding audio decoder is the adpcm decoder through FFMPEG_CODEC_ID_ADPCM_MS, or determine the corresponding decoder according to 0x11006. The specific process is the same as the above-mentioned process for MP3, and will not be repeated here.

S410: configuring the video stream as video/ffmpeg.

Specifically, on the basis that the type ID is mimetype, the video/ffmpeg identifier is configured for the video stream, and the identifier is used as the video stream identifier. When configuring decoders in the case it is determined that the video stream identifier is video/ffmpeg, the parsing and decoding method of the disclosure, that is, the video processing method using the FFmpeg module, is selected, that is, the video stream identifier corresponds to the decoding strategy.

S411: determining a format of the video stream.

For a video file in MP4 format, the format of the video stream includes mjpeg and sorenson, it is determined whether the format of the audio stream is mjpeg or sorenson, if it is mjpeg, S412 is performed, and if it is sorenson, S413 is performed.

S412: configuring a video decoder identifier for the video stream as FFMPEG_CODEC_ID_MJPEG.

In the same way, if the format of the video stream is mjpeg, the configured video decoder identifier for the video stream is FFMPEG_CODEC_ID_MJPEG, and the decoder corresponding to the identifier can decode the video stream in mjpeg format. For example, parsing and configuring the decoder ID as follows:

define FFMPEG_CODEC_ID_MJPEG 0x8.

Video stream mjpeg:Chunk type is jpeg, the video stream MimeType is configured to be video/ffmpeg, and CodecID is configured to be FFMPEG_CODEC_ID_MJPEG.

Where FFMPEG_CODEC_ID_MJPEG is the video decoder identifier. A value is assigned to the video decoder identifier, that is, a value of 0x8 is assigned. When sending the video decoder identifier is sent to FFmpeg, FFMPEG_CODEC_ID_MJPEG and the assigned value of 0x8 are sent to FFmpeg together, therefore, FFmpeg can determine that the corresponding video decoder is mjpeg decoder through FFMPEG_CODEC_ID_MJPEG, or determine the corresponding decoder according to 0x8. The specific process is the same as the above-mentioned process for MP3, and will not be repeated here.

S413: configuring a video decoder identifier for the video stream as FFMPEG_CODEC_ID_SORENSON.

In the same way, if the format of the video stream is sorenson, the configured video decoder identifier for the video stream is FFMPEG_CODEC_ID_SORENSON, and the decoder corresponding to the identifier can decode the video stream in sorenson format. For example, parsing and configuring the decoder ID as follows:

define FFMPEG_CODEC_ID_SORENSON 0x18.

Video stream sorenson:Chunk type is sorenson, the video stream MimeType is configured to be video/ffmpeg, and CodecID is configured to be FFMPEG_CODEC_ID_SORENSON.

Where FFMPEG_CODEC_ID_SORENSON is the video decoder identifier. A value is assigned to the video decoder identifier, that is, a value of 0x18 is assigned. When sending the video decoder identifier to FFmpeg, FFMPEG_CODEC_ID_SORENSON and the assigned value of 0x18 are sent to FFmpeg together, therefore, FFmpeg can determine that the corresponding video decoder is the sorenson decoder through FFMPEG_CODEC_ID_SORENSON, or determine the corresponding decoder according to 0x18. The specific process is the same as the above-mentioned process for MP3, and will not be repeated here.

Through the extension of the MP4 parser mentioned above, the previously unsupported video can be parsed normally to acquire the binary data that needs to be decoded.

APP calls MediaCodec and sends out the correct audio and video stream MimeType, selects the ffmpeg decoder system integrated in the system, and accurately configures the relevant decoders in ffmpeg through CodecID.

In addition, when the client is playing a video file that is not supported by the system play module, compared to calling a third-party application to soft decode the video file to play the video, the method of the disclosure may avoid switching to the video play interface of the third-party application, and uses the system play module to the play video file without jumping.

Figure 5:
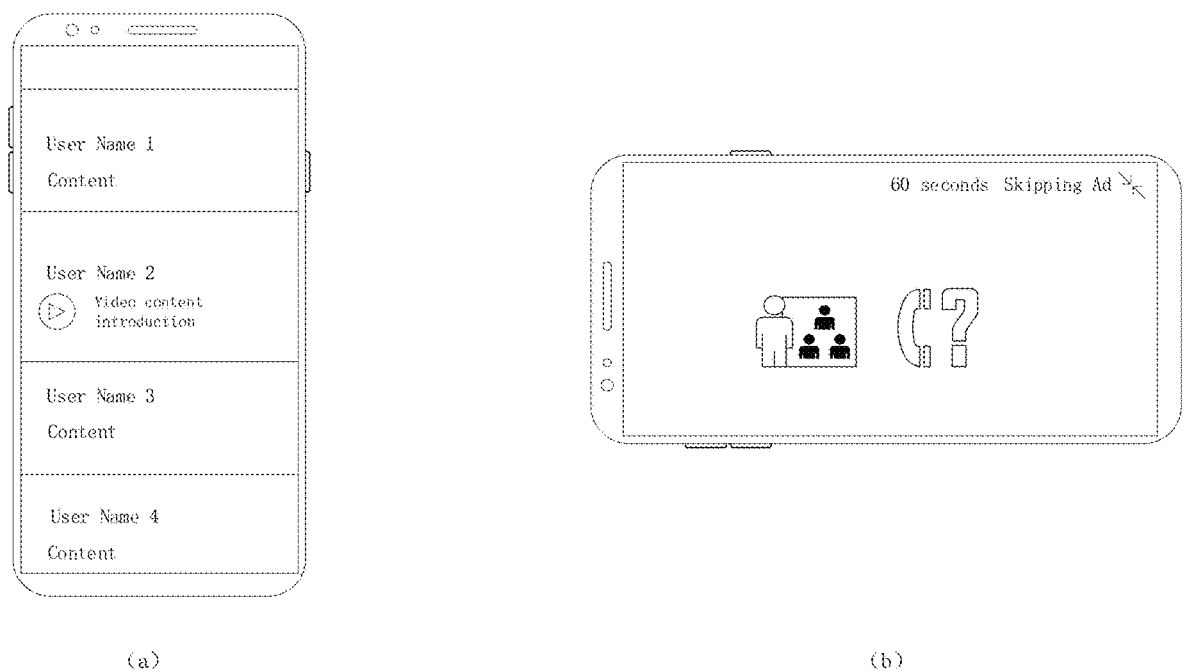
FIG. 5 is a schematic diagram showing interface changes when a client plays a video according to an embodiment of the disclosure.
Figure 6:
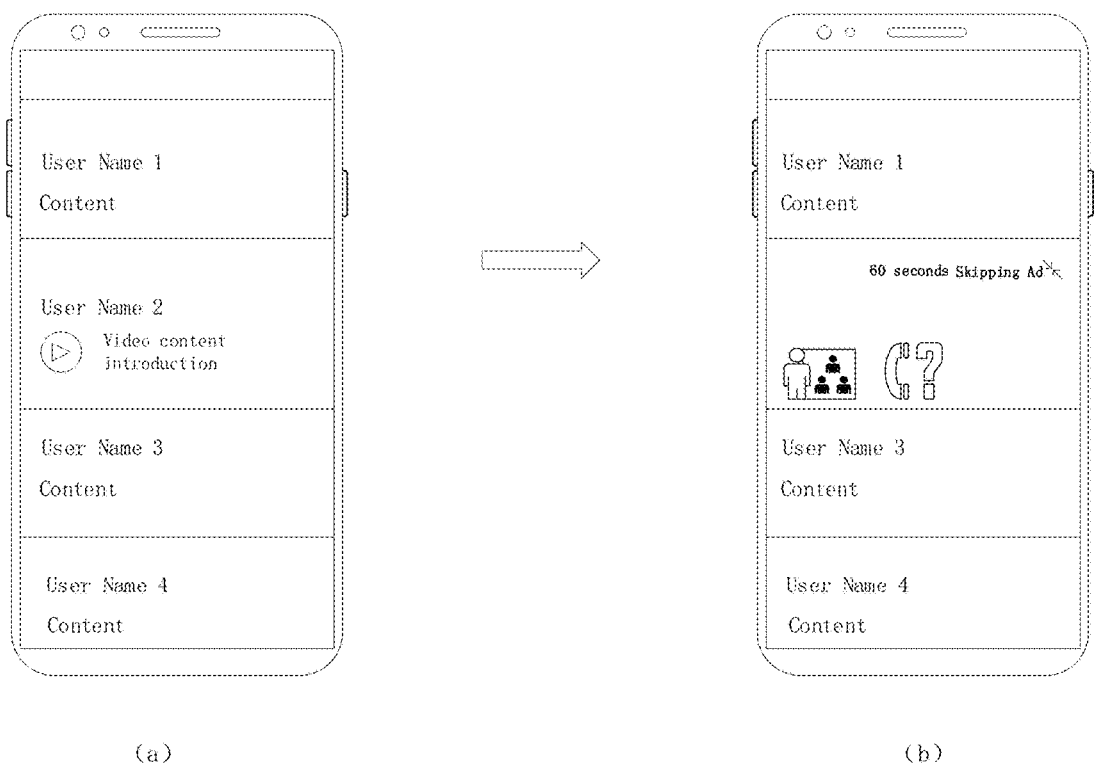
FIG. 6 is a schematic diagram showing interface changes when a client plays a video according to another embodiment of the disclosure.

Specifically, as shown in FIG. 5, the picture in FIG. 5(a) is the interface of the client, and the play button of the to-be-played video file is displayed in the interface, that is, the play button corresponding to "video content". The user clicks the play button, if a third-party application is called to play the video, the client will be switched to the background, and the third-party application is called and switched to the foreground, as shown in FIG. 5(b). If the video processing method of the disclosure is adopted, the system play module and FFmpeg will parse and decode the video in the background, which will not cause the client to be switched to the background, and as shown in FIG. 6(b), the video is still played on the interface of the client.

Figure 7:
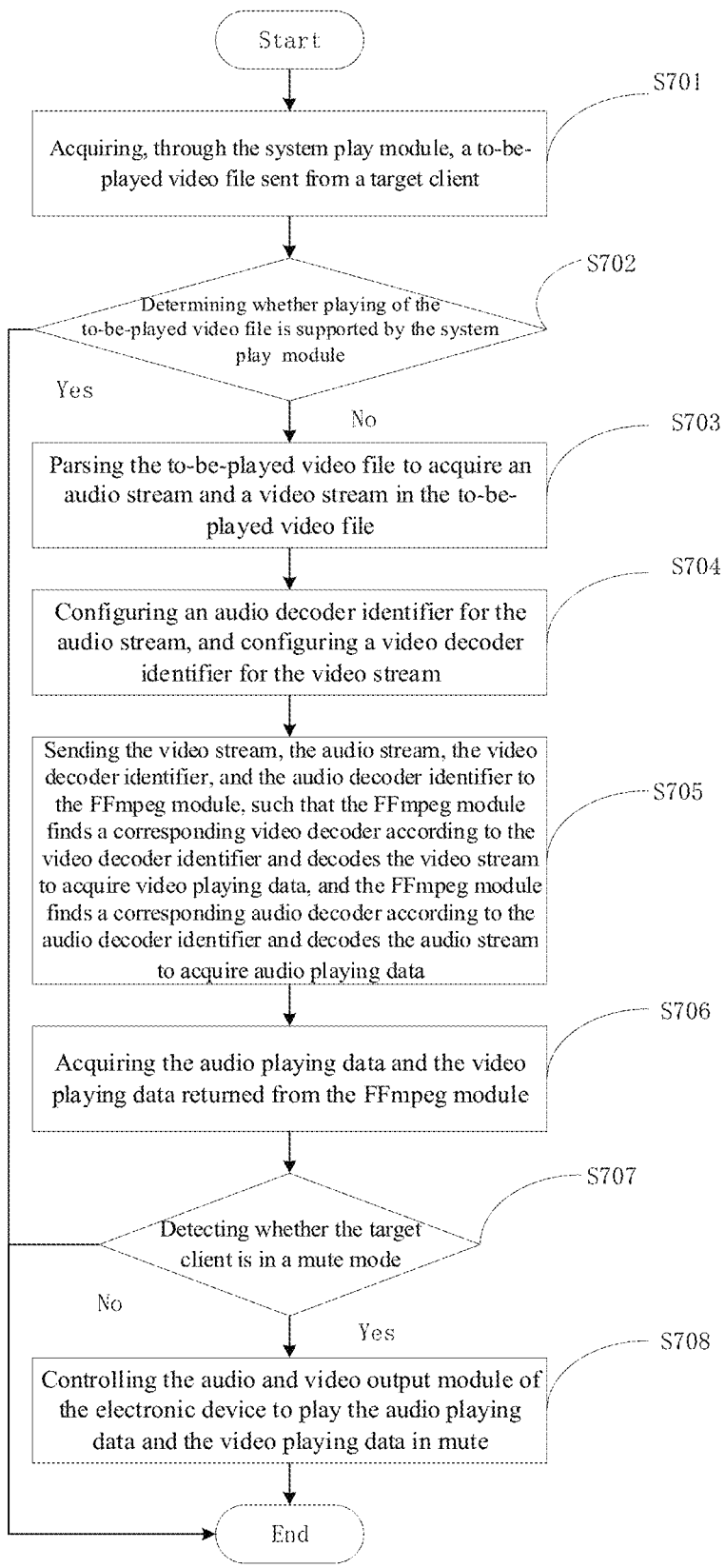
FIG. 7 is a flowchart showing a video processing method according to still another embodiment of the disclosure.

In addition, if the client does not call a third-party application to play the video, after the user mute the client, it can be avoided that the playing of the video makes sound because of playing the video with a third-party application. Specifically, as shown in FIG. 7, an embodiment of the disclosure provides a video processing method applied to the above-mentioned electronic device, the electronic device includes a system play module and an FFmpeg module, specifically, the method is executed by the system play module, and the method includes: S701 to S708.

S701: acquiring, through the system play module, a to-be-played video file sent from a target client.

S702: determining whether playing of the to-be-played video file is supported by the system play module.

S703: parsing the to-be-played video file to acquire an audio stream and a video stream in the to-be-played video file.

S704: configuring an audio decoder identifier for the audio stream, and configuring a video decoder identifier for the video stream.

S705: sending the video stream, the audio stream, the video decoder identifier, and the audio decoder identifier to the FFmpeg module, such that the FFmpeg module determines a corresponding video decoder according to the video decoder identifier and decodes the video stream to acquire video playing data, and the FFmpeg module determines a corresponding audio decoder according to the audio decoder identifier and decodes the audio stream to acquire audio playing data.

S706: acquiring the audio playing data and the video playing data returned from the FFmpeg module.

After acquiring the audio playing data and the video playing data, the FFmpeg module can send the audio playing data and the video playing data to the system play module, and the system play module controls the audio and video output module of the electronic device to use an audio play device (for example, a speaker, an earpiece, an earphone, etc.) to play the audio playing data, and use a video play device (for example, a screen) to play the video playing data.

Of course, the FFmpeg module may also directly control the audio and video output module of the electronic device to output the audio playing data and the video playing data.

In the embodiment of the disclosure, the FFmpeg module returns the decoded audio playing data and video playing data to the system play module, then the system play module can control the audio and video output module of the electronic device to play the audio playing data and the video playing data. As a result, the system play module still uses the native play logic to play the video, with higher portability.

S707: detecting whether the target client is in a mute mode.

Where the target client is the client that requests to play the to-be-played video file.

As an implementing manner, the way to determine whether the target client is in the mute mode is to acquire the volume parameter of the target client, if the volume parameter is the target parameter, it is determined that the target client is in the mute mode, and if the volume parameter is not the target parameter, it is determined that the target client is not in the mute mode.

In the embodiment of the disclosure, the first parameter corresponds to the mute state, the second parameter corresponds to the un-mute state, and the target parameter is the first parameter. When the target client is playing audio, the volume parameter corresponding to the target client is read. If the read volume parameter is the first parameter, that is, the volume parameter is the target parameter, muting the target client, that is, the volume state of the application is mute at this time. If the volume parameter is the second parameter, that is, the volume parameter is not the first parameter, the target client is instructed to play the video file according to a preset volume, that is, the volume state of the application is un-mute at this time. The specific implementing manner of muting the target client may be to prohibit playing the video file in the target client, or to play the video file in mute, that is, to run the video file without playing the video file through devices such as speakers or earphones.

Specifically, the volume parameter of the target client may be set by the user, for example, the volume parameter is set for the target client through the input device of the mobile terminal. As an implementing manner, a volume control key for the target client can be set. The volume control key for the target client includes at least two logic states, namely a first state and a second state, where the first state corresponds to the first parameter, and the second state corresponds to the second parameter, moreover, the audio of the target client can be set to be mute, that is, in a mute mode. In the mute mode, the client can play all video files or audio files without making sound.

As another implementing manner, the method of detecting whether the target client is in a mute mode is: determining whether there is any other client currently playing audio; when there is any other client playing audio, determining that the target client is in the mute mode.

Determining whether there is any other client currently playing audio, when there is any other client playing audio, determining that the web client meets the mute condition, when there is no other client playing audio, determining that the web client does not meet the mute condition. Specifically, the system can check the startup and operating data of the client installed in the mobile terminal through some specific API interfaces or SDK components. Specifically, the external interface of the audio manager of the system can be used to check whether there is any application playing audio in the current system, for example, by acquiring the return result of isMusicActive( ) to determine whether there is any other application playing audio files. When there is, it is determined that the target client is in the mute mode; otherwise, it is determined that the target client is not in the mute mode.

S708: controlling the audio and video output module of the electronic device to play the audio playing data and the video playing data in mute.

When the target client is not in the mute mode, the audio and video output module of the electronic device is controlled to play the audio playing data and the video playing data at a preset volume, where the preset volume can be a current system volume or a volume value set for the target client.

Figure 8:
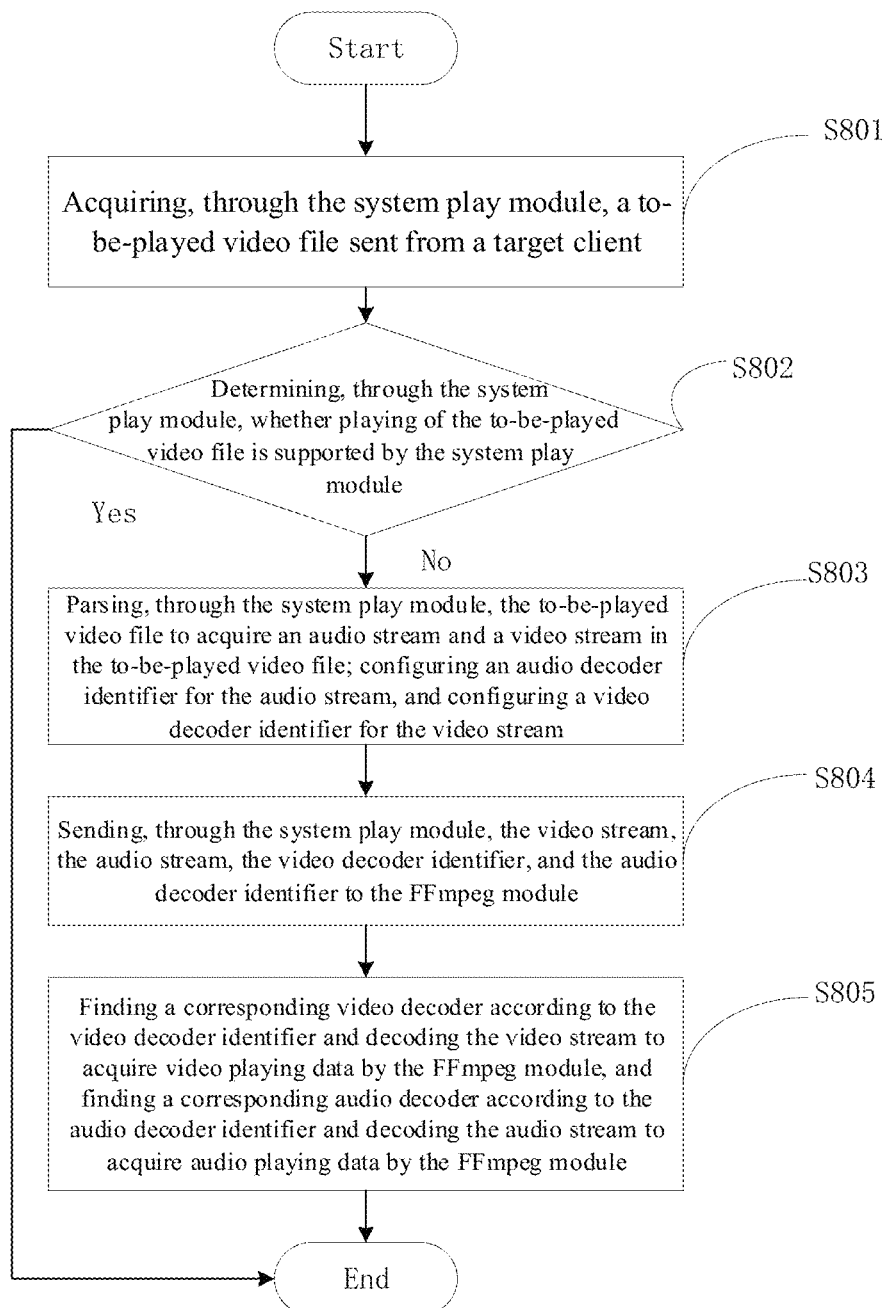
FIG. 8 is a flowchart showing a video processing method according to yet another embodiment of the disclosure.

Referring to FIG. 8, an embodiment of the disclosure provides a video play method applied to the above-mentioned electronic device, and the electronic device includes a system play module and an FFmpeg module. Specifically, the method is an interaction process between the system play module and the FFmpeg module, and the method includes: S801 to S805.

S801: acquiring, through the system play module, a to-be-played video file sent from a target client.

S802: determining, through the system play module, whether playing of the to-be-played video file is supported by the system play module.

S803: parsing, through the system play module, the to-be-played video file to acquire an audio stream and a video stream in the to-be-played video file; configuring an audio decoder identifier for the audio stream, and configuring a video decoder identifier for the video stream.

S804: sending, through the system play module, the video stream, the audio stream, the video decoder identifier, and the audio decoder identifier to the FFmpeg module.

S805: determining a corresponding video decoder according to the video decoder identifier and decoding the video stream to acquire video playing data by the FFmpeg module, and determining a corresponding audio decoder according to the audio decoder identifier and decoding the audio stream to acquire audio playing data by the FFmpeg module.

The specific implementing manner of decoding, through the FFmpeg module, the to-be-played video file to acquire audio playing data and video playing data may be the steps shown in FIG. 3. After parsing, the system play module sends the video stream, the audio stream, the video decoder identifier, and the audio decoder identifier to the FFmpeg module, such that the FFmpeg module determines the corresponding video decoder according to the video decoder identifier and decodes the video stream to acquire video playing data, and the FFmpeg module determines a corresponding audio decoder according to the audio decoder identifier and decodes the audio stream to acquire audio playing data.

As another implementing manner, the FFmpeg module has a function of video parsing and decoding, and specific implementing manner of decoding, through the FFmpeg module, the to-be-played video file to acquire audio playing data and video playing data may be: acquiring, through the FFmpeg module, an audio stream and a video stream in the to-be-played video file; determining a corresponding video decoder according to the type of the video stream and decoding the video stream to acquire video playing data by the FFmpeg module, and determining a corresponding audio decoder according to the type of the audio stream and decoding the audio stream to acquire audio playing data by the FFmpeg module.

Specifically, the embodiment of the disclosure shows the interaction process between the system play module and the FFmpeg module, please refer to the foregoing embodiments for the detailed implementing manner.

Figure 9:
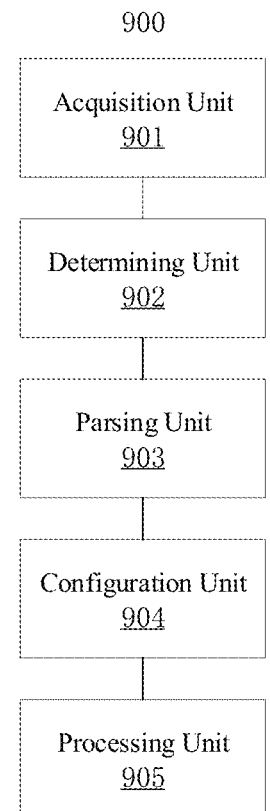
FIG. 9 is a block diagram showing a video processing apparatus according to an embodiment of the disclosure.

Referring to FIG. 9, it is a block diagram showing the structure of a video processing apparatus 900 according to an embodiment of the disclosure. The device may include: an acquisition unit 901, a determining unit 902, a parsing unit 903, a configuration unit 904, and a processing unit 905.

The acquisition unit 901 is configured to acquire a to-be-played video file sent from a target client.

The determining unit 902 is configured to determine whether playing of the to-be-played video file is supported.

The parsing unit 903 is configured to parse the video file to acquire an audio stream and a video stream in the video file upon determining playing of the to-be-played video file is not supported.

The configuration unit 904 is configured to configure an audio decoder identifier for the audio stream, and configure a video decoder identifier for the video stream.

The processing unit 905 is configured to send the video stream, the audio stream, the video decoder identifier, and the audio decoder identifier to a FFmpeg module, such that the FFmpeg module determines a corresponding video decoder according to the video decoder identifier and decodes the video stream to acquire video playing data, and the FFmpeg module determines a corresponding audio decoder according to the audio decoder identifier and decodes the audio stream to acquire audio playing data. Where the audio playing data and the video playing data are configured to be played by an audio and video output module of the electronic device.

In addition, a play unit is also included for acquiring the audio playing data and the video playing data returned from the FFmpeg module, and controlling the audio and video output module of the electronic device to play the audio playing data and the video playing data.

The above-mentioned units are located in the system play module, and may be program codes for setting and implanting the video play module.

Those of ordinary skill in the art can clearly understand that, for the convenience and conciseness of the description, the corresponding process in the foregoing method embodiments can be referred to for specific working process of the above-described apparatus and module, which will not be repeated here.

In the several embodiments provided in the disclosure, the coupling between the modules may be electrical coupling, mechanical coupling or other forms of coupling.

In addition, function modules in each embodiment of the disclosure may be integrated into one processing module, or each module may exist alone physically, or two or more modules may be integrated into one module. The above-mentioned integrated module can be implemented in the form of hardware or software function module.

Figure 10:
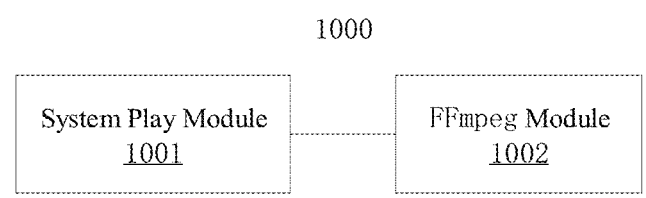
FIG. 10 is a block diagram showing a video processing apparatus according to another embodiment of the disclosure.

Referring to FIG. 10, an embodiment of the disclosure also provides a video processing apparatus 1000, which includes a system play module 1001 and an FFmpeg module 1002.

The system play module 1001 is configured to: acquire a to-be-played video file sent from a target client; determine whether playing of the to-be-played video file is supported; upon determining playing of the to-be-played video file is not supported, parse the video file to acquire an audio stream and a video stream in the video file, configure an audio decoder identifier for the audio stream, and configure a video decoder identifier for the video stream, and send the video stream, the audio stream, the video decoder identifier, and the audio decoder identifier to the FFmpeg module 1002.

The FFmpeg module 1002 is configured to: determine a corresponding video decoder according to the video decoder identifier and decode the video stream to acquire video playing data, and determine a corresponding audio decoder according to the audio decoder identifier and decode the audio stream to acquire audio playing data, where the audio playing data and the video playing data are configured to be played by an audio and video output module of an electronic device.

Those of ordinary skill in the art can clearly understand that, for the convenience and conciseness of the description, the corresponding process in the foregoing method embodiments can be referred to for specific working process of the above-described apparatus and module, which will not be repeated here.

In the several embodiments provided in the disclosure, the coupling between the modules may be electrical coupling, mechanical coupling or other forms of coupling.

In addition, function modules in each embodiment of the disclosure may be integrated into one processing module, or each module may exist alone physically, or two or more modules may be integrated into one module. The above-mentioned integrated module can be implemented in the form of hardware or software function module.

Figure 11:
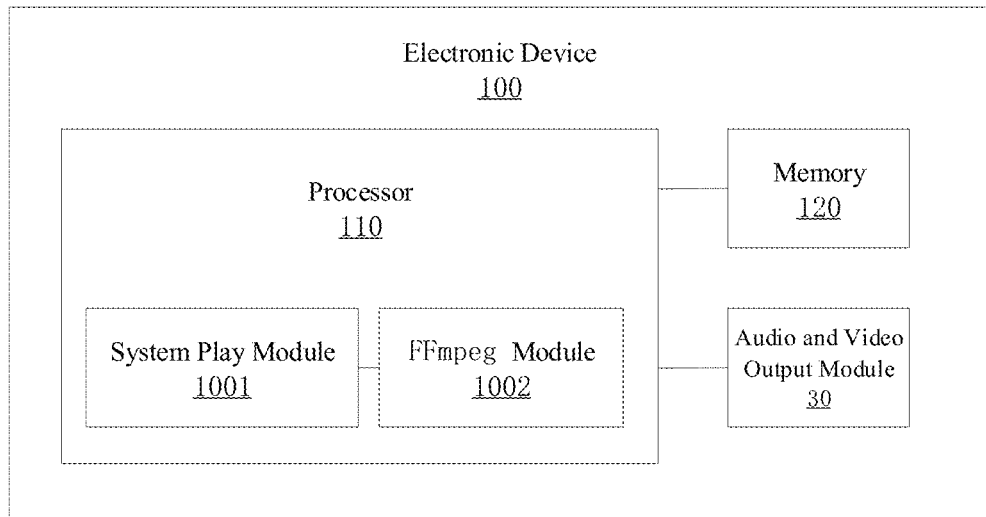
FIG. 11 is a block diagram showing a structure of an electronic device according to an embodiment of the disclosure.

Referring to FIG. 11, it is a block diagram showing the structure of an electronic device according to an embodiment of the disclosure. The electronic device 100 may be an electronic device capable of running applications, such as a smart phone, a tablet computer, or an e-book. The electronic device 100 in the disclosure may include one or more of the following components: a processor 110, a memory 120, an audio and video output module 30, and one or more programs, the one or more programs may be stored in the memory 120, and configured to be executed by one or more processors 110, and the one or more programs are configured to execute the methods described in the foregoing method embodiments.

The processor 110 may include one or more processing cores. The processor 110 uses various interfaces and lines to connect with various parts of the entire electronic device 100, and executes various functions of the electronic device 100 and processes data by running or executing instructions, programs, code sets, or instruction sets stored in the memory 120 and calling data stored in the memory 120. Optionally, the processor 110 may use implemented by at least one hardware form selected from Digital Signal Processing (DSP), Field-Programmable Gate Array (FPGA), and Programmable Logic Array (PLA). The processor 110 may integrates one or a combination of a Central Processing Unit (CPU), a Graphics Processing Unit (GPU), and a modem. Where the CPU mainly processes the operating system, the user interface, and the applications; the GPU is configured for the rendering and drawing of display content; the modem is configured for processing wireless communication. It can be understood that the above-mentioned modem may not be integrated into the processor 110, and may be implemented by a communication chip alone.

In addition, the processor 110 includes a system play module 1001 and an FFmpeg module 1002, and the foregoing embodiments can be referred to for the specific implementing manner of the system play module 1001 and the FFmpeg module 1002, which will not be repeated here.

The memory 120 may include a Random Access Memory (RAM), or may include a Read-Only Memory. The memory 120 may be used to store instructions, programs, codes, code sets or instruction sets. The memory 120 may include a program storage area and a data storage area, where the program storage area may store instructions for implementing the operating system, instructions for implementing at least one function (such as touch function, sound playing function, image playing function, etc.), and instructions for implementing the method embodiments, etc. The data storage area may store data created by the electronic device 100 during use, such as a phone book, audio data, video data, chat record data, and the like.

Figure 12:
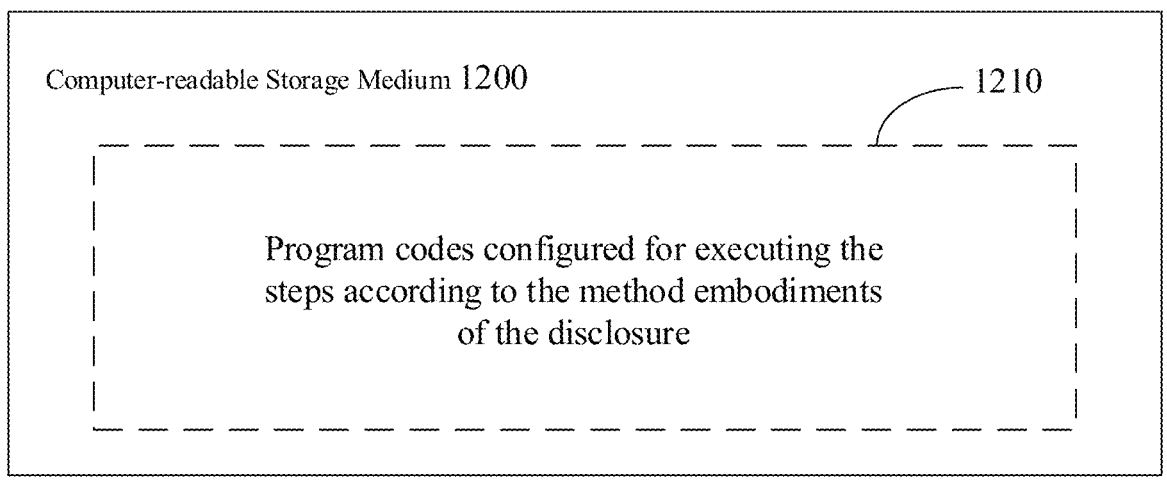
FIG. 12 showing a storage unit for storing or carrying program codes for implementing the video processing methods according to embodiments of the disclosure.

Referring to FIG. 12, it is a block diagram showing the structure of a computer-readable storage medium according to an embodiment of the disclosure. The computer-readable storage medium 1200 stores program codes, and the program codes can be called by a processor to perform the methods described in the foregoing method embodiments.

The computer-readable storage medium 1200 may be an electronic memory such as a flash memory, an Electrically Erasable Programmable Read Only Memory (EEPROM), an EPROM, a hard disk, or a ROM. Optionally, the computer-readable storage medium 1200 includes a non-transitory computer-readable storage medium. The computer-readable storage medium 1200 has a storage space for the program codes 1210 configured for executing any method steps in the above methods. These program codes can be read from one or more computer program products, or be written into the one or more computer program products. For example, the program codes 1210 may be compressed in an appropriate form.

It should be noted that the above embodiments are only used to describe the technical solutions of the disclosure, but not intended to limit the disclosure. Although the disclosure has been described in detail with reference to the foregoing embodiments, those of ordinary skill in the art should understand: the technical solutions recorded in the foregoing embodiments still can be modified, or some of the technical features thereof can be equivalently replaced, and these modifications or replacements do not drive the essence of the corresponding technical solutions to deviate from the spirit and scope of the technical solutions of the embodiments of the disclosure.

What is claimed is:

1. A video processing method, applied to an electronic device comprising a system play module and an FFmpeg module, the system play module being a default play module in an operating system of the electronic device, the FFmpeg module being implanted into the operating system of the electronic device, the FFmpeg module supporting more formats of audio decoders and video decoders than the system play module, the method comprising:

acquiring, through the system play module, a to-be-played video file sent from a target client, wherein the target client is an application that is installed in the electronic device and requests the to-be-played video file to be played, and the to-be-played video file is determined based on an operation performed on a play button that is displayed in an interface of the target client;

determining whether playing of the acquired to-be-played video file is supported by the system play module; and upon determining playing of the acquired to-be-played video file is not supported by the system play module:

parsing, through the system play module, the acquired to-be-played video file to acquire an audio stream and a video stream in the to-be-played video file, configuring, through the system play module, an audio decoder identifier for the audio stream, and configuring, through the system play module, a video decoder identifier for the video stream;

sending, through the system play module, the video stream, the audio stream, the video decoder identifier, and the audio decoder identifier to the FFmpeg module, wherein a calling interface is defined between the system play module and the FFmpeg module, and the system play module and the FFmpeg module all run in background of the electronic device;

determining, through the FFmpeg module, a corresponding video decoder according to the video decoder identifier, and decoding, through the corresponding video decoder, the video stream to acquire video playing data;

determining, through the FFmpeg module, a corresponding audio decoder according to the audio decoder identifier, and decoding, through the corresponding audio decoder, the audio stream to acquire audio playing data, the audio playing data and the video playing data being configured to be played by an audio and video output module of the electronic device; and sending, from the FFmpeg module, the video playing data and the audio playing data to the system play module, and controlling, through the system play module, the audio and video output module of the electronic device to play the audio playing data and the video playing data, to present the to-be-played video file in the interface of the target client, without switching to a video play interface of a third-party application.

2. The method as claimed in claim 1, further comprising: determining a type of the video stream and a type of the audio stream; wherein the configuring, through the system play module, an audio decoder identifier for the audio stream comprises: configuring the video decoder identifier for the video stream according to the type of the video stream; and the configuring, through the system play module, a video decoder identifier for the video stream comprises: configuring the audio decoder identifier for the audio stream according to the type of the audio stream.

3. The method as claimed in claim 1, wherein the determining whether playing of the acquired to-be-played video file is supported by the system play module comprises:

acquiring a target type of the acquired to-be-played video file; and determining whether playing of the acquired to-be-played video file of the target type is supported by the system play module.

4. The method as claimed in claim 3, wherein the determining whether playing of the acquired to-be-played video file of the target type is supported by the system play module comprises:

determining whether a type matched with the target type of the acquired to-be-played video file exists in a format list, the format list comprising at least one video file type that is supported to be played by the system play module;

upon determining the type matched with the target type of the acquired to-be-played video file exists, determining playing of the acquired to-be-played video file of the target type is supported by the system play module; and upon determining the type matched with the target type of the acquired to-be-played video file does not exist, determining playing of the acquired to-be-played video file is not supported by the system play module.

5. The method as claimed in claim 3, wherein the system play module is a MediaPlayer module, and the target type is an MP4 type.

6. The method as claimed in claim 1, wherein the controlling, through the system play module, the audio and video output module of the electronic device to play the audio playing data and the video playing data comprises:

detecting whether the target client is in a mute mode; and controlling the audio and video output module of the electronic device to play the audio playing data and the video playing data in mute, in response to determining that the target client is in the mute mode.

7. The method as claimed in claim 6, wherein the detecting whether the target client is in a mute mode comprises:

determining whether there is any other client currently playing audio; and when there is any other client currently playing audio, determining that the target client is in the mute mode.

8. The method as claimed in claim 6, wherein the detecting whether the target client is in a mute mode comprises:

acquiring a volume parameter of the target client;

if the volume parameter is a target parameter, determining that the target client is in the mute mode; and if the volume parameter is not the target parameter, determining that the target client is in an un-mute mode.

9. The method as claimed in claim 8, wherein the volume parameter comprises a first parameter and a second parameter, the first parameter corresponds to the mute mode, and the second parameter corresponds to the un-mute mode, the first parameter is the target parameter, and the method further comprises:

muting the target client if the volume parameter is the target parameter; and instructing the target client to play the to-be-played video file according to a preset volume if the volume parameter is not the target parameter.

10. The method as claimed in claim 9, wherein the muting the target client comprises:

forbidding to play the to-be-played video file.

11. The method as claimed in claim 2, wherein the determining a type of the video stream and a type of the audio stream comprises:

determining the type of the video stream and the type of the audio stream by acquiring extensions of the audio stream and the video stream.

12. The method as claimed in claim 1, wherein the sending the video stream and the audio stream to the FFmpeg module comprises:

sending an address identifier of the video stream and an address identifier of the audio stream to the FFmpeg module.

13. An electronic device, comprising:
a processor;
a memory;
an audio and video output module; and
one or more programs stored in the memory, wherein the processor comprises a system play module and a FFmpeg module, the system play module is a default play module in an operating system of the electronic device, the FFmpeg module is implanted into the operating system of the electronic device, the FFmpeg module supports more formats of audio decoders and video decoders than the system play module, and the processor is configured to perform, when executing the one or more programs, operations of:
acquiring, through the system play module, a to-be-played video file sent from a target client, wherein the target client is an application that is installed in the electronic device and requests the to-be-played video file to be played, and the to-be-played video file is determined based on an operation performed on a play button that is displayed in an interface of the target client; and
upon determining playing of the acquired to-be-played video file is not supported by the system play module:
sending, through the system play module, the acquired to-be-played video file to the FFmpeg module, wherein a calling interface is defined between the system play module and the FFmpeg module, and the system play module and the FFmpeg module all run in background of the electronic device;
parsing, through the FFmpeg module, the to-be-played video file to acquire an audio stream and a video stream in the to-be-played video file;
configuring, through the FFmpeg module, an audio decoder identifier for the audio stream, and configuring, through the FFmpeg module, a video decoder identifier for the video stream;
determining, through the FFmpeg module, a corresponding video decoder according to the video decoder identifier, and decoding, through the corresponding video decoder, the video stream to acquire video playing data through the FFmpeg module;
determining, through the FFmpeg module, a corresponding audio decoder according to the audio decoder identifier, and decoding, through the corresponding audio decoder, the audio stream to acquire audio playing data through the FFmpeg module;
acquiring, through the system play module, the audio playing data and the video playing data returned from the FFmpeg module; and
controlling, through the system play module, the audio and video output module to play the audio playing data and the video playing data, to present the to-be-played video file in the interface of the target client, without switching to a video play interface of a third-party application.

14. The electronic device as claimed in claim 13, wherein the processor is further configured to perform operations of:
acquiring a target type of the acquired to-be-played video file; and
determining whether playing of the acquired to-be-played video file of the target type is supported by the system play module.

15. The electronic device as claimed in claim 14, wherein the operation of determining whether playing of the acquired to-be-played video file of the target type is supported by the system play module comprises:
determining playing of the acquired to-be-played video file of the target type is supported by the system play module upon determining a type matched with the target type of the acquired to-be-played video file exists in a format list, wherein the format list comprises at least one video file type that is supported to be played by the system play module; and
determining playing of the acquired to-be-played video file is not supported by the system play module upon determining the type matched with the target type of the acquired to-be-played video file does not exist in the format list.

16. The electronic device as claimed in claim 13, wherein the operation of controlling, through the system play module, the audio and video output module of the electronic device to play the audio playing data and the video playing data comprises:
detecting whether the target client is in a mute mode; and
controlling the audio and video output module of the electronic device to play the audio playing data and the video playing data in mute, in response to determining that the target client is in the mute mode.

17. The electronic device as claimed in claim 16, wherein the operation of detecting whether the target client is in a mute mode comprises:
determining whether there is any other client currently playing audio; and
when there is any other client currently playing audio, determining that the target client is in the mute mode.

18. The electronic device as claimed in claim 16, wherein the operation of detecting whether the target client is in a mute mode comprises:
acquiring a volume parameter of the target client;
if the volume parameter is a target parameter, determining that the target client is in the mute mode; and
if the volume parameter is not the target parameter, determining that the target client is in an un-mute mode.

19. The electronic device as claimed in claim 18, wherein the volume parameter comprises a first parameter and a second parameter, the first parameter corresponds to the mute mode, and the second parameter corresponds to the un-mute mode, the first parameter is the target parameter, and the processor is further configured to perform operations of:
muting the target client if the volume parameter is the target parameter; and
instructing the target client to play the to-be-played video file according to a preset volume if the volume parameter is not the target parameter.

20. A non-transitory computer-readable storage medium storing program codes thereon, wherein the program codes, when being executed by a processor of an electronic device, cause the processor to implement a video processing method comprising:
acquiring, through a system play module of the electronic device, a to-be-played video file sent from an application installed in the electronic device, wherein the system play module is a default play module in an operating system of the electronic device, and the to-be-played video file is determined based on an operation performed on a play button that is displayed in an interface of the application; and in response to determining playing of the acquired to-be-played video file is not supported by the system play module:

parsing, through the system play module, the acquired to-be-played video file to acquire an audio stream and a video stream in the to-be-played video file;

configuring, through the system play module, an audio decoder identifier for the audio stream, and configuring, through the system play module, a video decoder identifier for the video stream;

sending, through the system play module, the video stream, the audio stream, the video decoder identifier, and the audio decoder identifier to an FFmpeg module of the electronic device, wherein the FFmpeg module is implanted into the operating system of the electronic device and supports more formats of audio decoders and video decoders than the system play module, a calling interface is defined between the system play module and the FFmpeg module, and the system play module and the FFmpeg module all run in background of the electronic device;

determining, through the FFmpeg module, a corresponding video decoder according to the video decoder identifier, and decoding, through the corresponding video decoder, the video stream to acquire video playing data;

determining, through the FFmpeg module, a corresponding audio decoder according to the audio decoder identifier, and decoding, through the corresponding audio decoder, the audio stream to acquire audio playing data, the audio playing data and the video playing data being configured to be played by an audio and video output module of the electronic device;

acquiring, through the system play module, the decoded audio playing data and video playing data from the FFmpeg module; and controlling, through the system play module, the audio and video output module to play the decoded audio playing data and video playing data to present the to-be-played video file in the interface of the application, without switching to a video play interface of a third-party application.

* * * * *